United States Patent
McHugh et al.

(10) Patent No.: US 8,215,679 B2
(45) Date of Patent: *Jul. 10, 2012

(54) SUBSEA CHOKE INSERT LOCKING APPARATUS

(75) Inventors: Edmund McHugh, Longford Town (IE); Finbarr Evans, Ballynacargy (IE); Declan Elliott, Newtownforbes (IE)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,962

(22) Filed: Jan. 31, 2011

(65) Prior Publication Data

US 2011/0121565 A1 May 26, 2011

Related U.S. Application Data

(63) Continuation of application No. 11/445,898, filed on Jun. 2, 2006, now Pat. No. 7,878,551.

(51) Int. Cl.
*F16L 37/091* (2006.01)
*F16L 37/138* (2006.01)

(52) U.S. Cl. .............. 285/308; 285/26; 285/35; 285/86; 285/310; 285/920; 285/922; 166/339

(58) Field of Classification Search .................... 285/26, 285/29, 33–35, 82–86, 92, 102, 309, 310, 285/315, 920, 922; 166/339, 365, 85.3

See application file for complete search history.

(56) References Cited

U.S. PATENT DOCUMENTS

| | | | |
|---|---|---|---|
| 3,297,344 A | 1/1967 | Hanes |
| 3,455,578 A | 7/1969 | Hanes |
| 3,912,009 A | 10/1975 | Davis |
| 3,929,355 A | 12/1975 | Sljusar |
| 4,138,148 A | 2/1979 | Zaremba |
| 4,277,875 A | 7/1981 | Worrell |
| 4,333,531 A | 6/1982 | Lawson |
| 4,364,587 A | 12/1982 | Samford |
| 4,405,016 A | 9/1983 | Best |
| 4,433,859 A | 2/1984 | Driver et al. |
| 4,441,740 A | 4/1984 | Cowan et al. |
| 4,441,741 A | 4/1984 | Galle, Jr. |
| 4,496,172 A | 1/1985 | Walker |
| 4,501,443 A | 2/1985 | Haring |
| 4,526,406 A | 7/1985 | Nelson |
| 4,593,937 A | 6/1986 | Schawann et al. |
| 4,796,922 A | 1/1989 | Prichard |
| 4,893,842 A | 1/1990 | Brammer |
| 4,941,534 A | 7/1990 | Berzin |
| 4,962,579 A | 10/1990 | Moyer et al. |
| 5,026,200 A | 6/1991 | Van Bilderbeek |
| 5,163,514 A | 11/1992 | Jennings |
| 5,631,563 A | 5/1997 | Moriarty |

(Continued)

FOREIGN PATENT DOCUMENTS

GB 948331 1/1964

(Continued)

*Primary Examiner* — James Hewitt
(74) *Attorney, Agent, or Firm* — Fletcher Yoder, P.C.

(57) ABSTRACT

A connection for sub-sea use employs locking dogs that are isolated from seawater and a backup system for operating the backup sleeve to the dogs. The normal actuation system for the backup sleeve is also isolated from seawater exposure. The set position of the backup sleeve is positively retained against the prospect of axial movement that could be triggered by transmitted vibration into the connection.

27 Claims, 3 Drawing Sheets

U.S. PATENT DOCUMENTS

| | | | |
|---|---|---|---|
| 5,799,949 | A | 9/1998 | Beall et al. |
| 6,062,312 | A | 5/2000 | Wilkins |
| 6,237,964 | B1 | 5/2001 | Ostergaard |
| 6,260,624 | B1 | 7/2001 | Pallini et al. |
| 6,554,324 | B1 | 4/2003 | Herman |
| 6,609,734 | B1 | 8/2003 | Baugh |
| 7,344,162 | B2 | 3/2008 | Van Bilderbeek |
| 7,377,555 | B2 | 5/2008 | Smith, III |
| 7,469,931 | B2 | 12/2008 | Biester |
| 7,878,551 | B2 * | 2/2011 | McHugh et al. .............. 285/308 |
| 2005/0146137 | A1 | 7/2005 | Davidson et al. |

FOREIGN PATENT DOCUMENTS

| | | |
|---|---|---|
| NO | 160026 | 11/1988 |
| NO | 161342 | 4/1989 |
| NO | 163546 | 6/1990 |
| NO | 165390 | 10/1990 |
| NO | 165630 | 12/1990 |
| NO | 167600 | 12/1991 |
| NO | 168847 | 12/1991 |
| NO | 176937 | 3/1995 |
| NO | 308269 | 8/2000 |

* cited by examiner

SUBSEA CHOKE INSERT LOCKING APPARATUS

CROSS-REFERENCES TO RELATED APPLICATIONS

This application is a continuation of U.S. patent application Ser. No. 11/445,898, entitled "Subsea Choke Insert Locking Apparatus", filed on Jun. 2, 2006, which issued as U.S. Pat. No. 7,878,551 on Feb. 1, 2011, which is herein incorporated by reference in its entirety.

STATEMENT REGARDING FEDERALLY SPONSORED RESEARCH OR DEVELOPMENT

Not Applicable.

BACKGROUND

In accordance with certain embodiments, the present invention relates to method and apparatus for lockable inserts for oilfield equipment and, more particularly, to equipment used subsea for choke applications among others.

Offshore oilfield operation frequently requires making connections subsea, typically using Remotely Operated Vehicles (ROVs) or divers. Typically a connection between a male and female component completes the subsea connection. The connection can be a pipe coupling or the insertion of a valve interior component into a housing that is located subsea. Once the connection is brought together it is locked into that position, thus securing the connection.

The subsea environment is hostile, and issues of attack on the components over a period of time are a concern in any such connection. Another general concern is debris that can get into the area where the locking is to take place. Over time some of these effects can operate in tandem to preclude a secure locking of the connection or to prevent unlocking when it is time to undo the connection. Exposure of the actuation assembly to seawater can also undermine its effective operation. Yet another issue affecting such connections is the long term effect of transmitted vibration to the connection, which can unintentionally move the actuation mechanism that locks the locking dogs into a surrounding recess or groove and potentially cause an inadvertent separation of the connected components.

U.S. Pat. No. 6,237,964 is illustrative of the issues that are confronted in such subsea connections. With reference to the numerical reference numbers presented in this patent, Ostergaard shows a female component 14 that accepts a valve insert 4 and 6. To connect these components, an actuating sleeve 20 is movable axially as the ring gear 28 that has threads 26 engages threads 24 on sleeve 20 to urge the sleeve down behind dogs 45. The downward movement of the sleeve places dogs 45 into a locked position where surfaces 41 and 44 engage, thus locking the connection. In essence, the lower end of sleeve 20 cams the dogs 45 into locking engagement with the opposing recess in the female component 14. A seal 18 is at the same time actuated to hold the pressure within the connection when the two components are locked together.

A few features of this design are worth noting. The dogs 45 and their surrounding groove are exposed to seawater that enters between housing 11 and top face 22. The operating mechanism that moves the sleeve 20 axially up or down is also exposed to seawater where the threads for driving engage one another. Additionally, there is no backup device to unlock the connection if the sleeve 20 fails to come up with the existing drive system. Finally, there is no device in this assembly to compensate for transmitted vibration which could result in inadvertent axial motion of sleeve 20 as vibration induces rotation back to input shaft 34. In essence, the connection can inadvertently release because of vibration induced axial movement of the sleeve 20 that induce rotation at the threaded connection and back to input shaft 34.

A similar design is offered by Liaaen and shown in FIG. 1. It features a female component or valve body 10 that accepts a male component or insert 12. When the two components are pushed together, a seal 14 retains pressure within the body 10. In the split view of FIG. 1 it can be seen that the insert 12 is secured to the body 10 by the urging of the dogs 18 into an opposing recess or slot 16. An axially movable sleeve 20 then gets behind dogs 18 to prevent retraction of the dogs from recess 16. An input shaft 22 rotates a mating thread 24 with the result being that the sleeve 20 can be moved axially in opposed directions. While a housing 26 keeps the driving components for the insert 12 isolated from seawater, it is clear that the rest of the components for locking the connection are exposed to seawater via fluid pathways represented by arrow system 30. Seawater can have negative impacts on a threaded connection 24 by precluding makeup or release with no backup system available to raise sleeve 20 if rotation of shaft 22 does not get the job done, for instance. The dogs 18 are in seawater, and there is no anchoring mechanism to hold the position of sleeve 20 against vibratory forces.

Those skilled in the art will appreciate the manner in which such problems are addressed from the description of the preferred embodiment, the drawings and from the full scope of the invention in the appended claims.

SUMMARY OF THE INVENTION

In accordance with certain embodiments, the present invention provides a connection for subsea use that employs locking dogs that are isolated from seawater and includes a backup system for operating the sleeve that positions the dogs. The normal actuation system for the sleeve is also isolated from seawater exposure. The set position of the sleeve is positively retained against the prospect of axial movement that could be triggered by transmitted vibration into the connection.

DETAILED DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
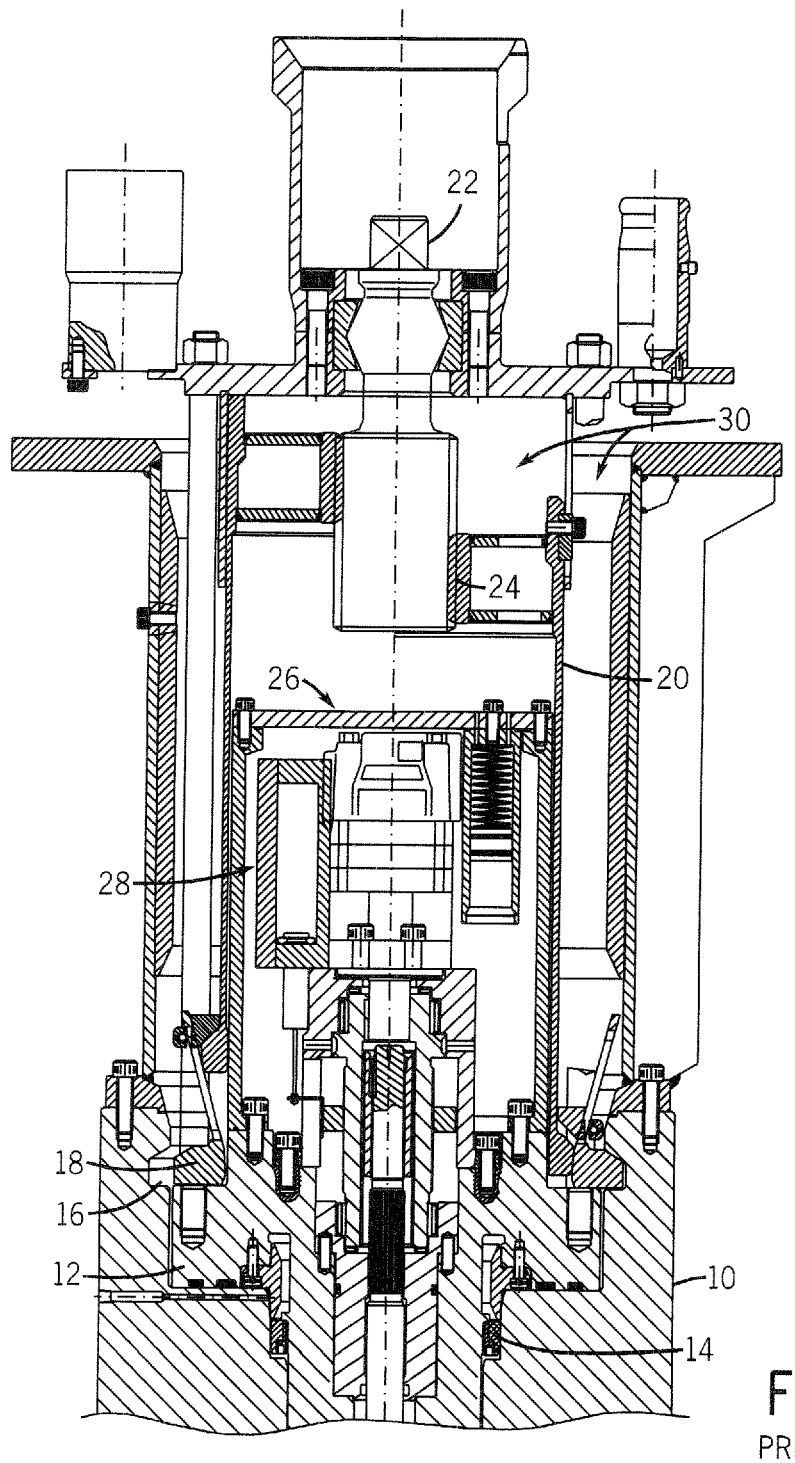
FIG. 1 is a prior art design shown in section.
Figure 2:
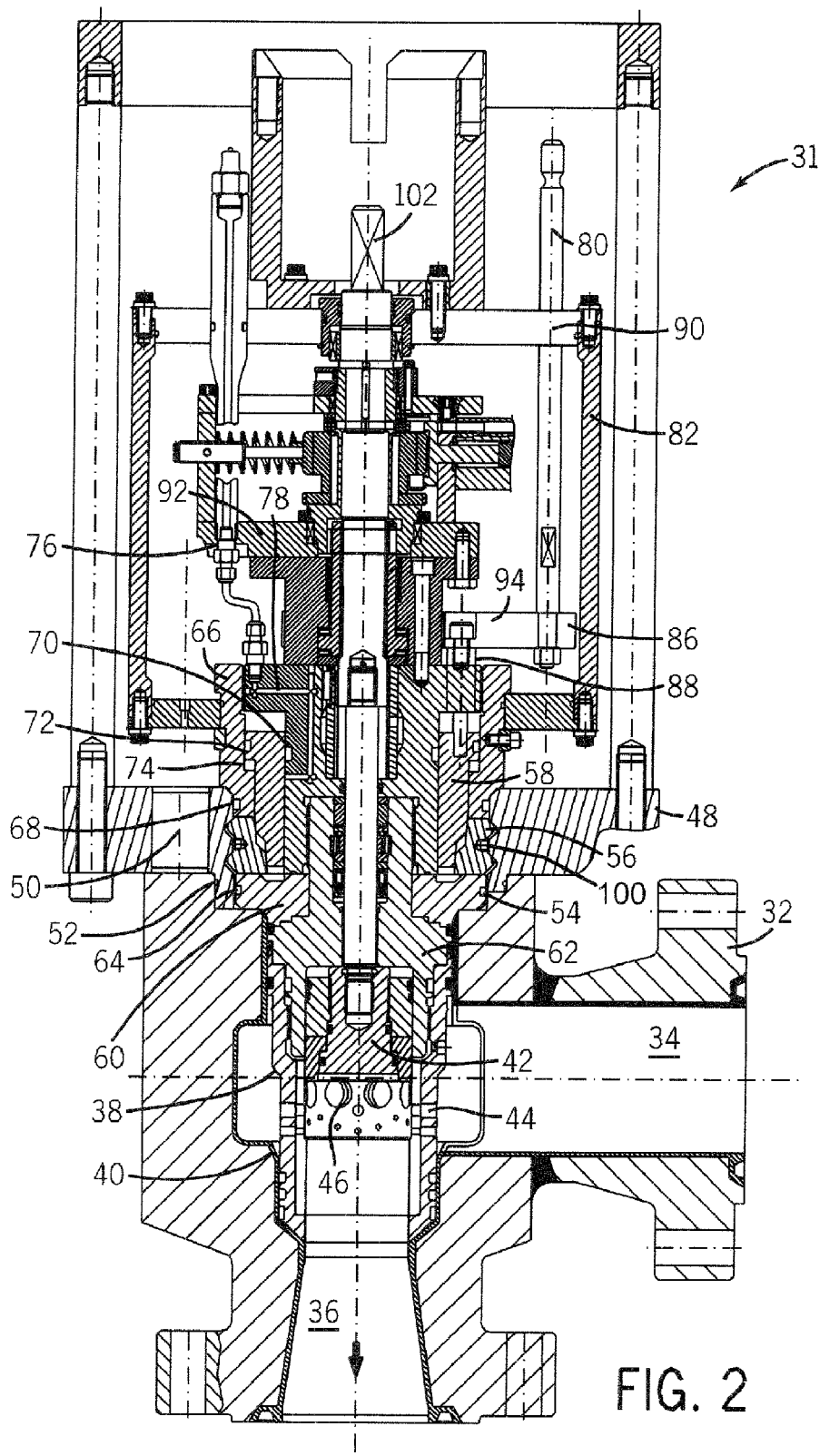
FIG. 2 is a section view showing various aspects of the present invention in accordance with certain exemplary embodiments.

FIG. 2 illustrates an exemplary choke 31 where the body 32 (e.g., a female component) has an inlet 34 and an outlet 36. This exemplary choke 31 includes an insert assembly 38 (e.g., a male component) that features an exterior stationary cage 40 and a movable plug 42 that is operated within so that ports 44 and 46 can be brought into or out of alignment. Body 32 has a top flange 48 secured to it through bolt holes 50 with fasteners (not shown). Seal 52 seals between the body 32 and the flange 48. Flange 48 has a recess or circular groove or grooves or some other surface irregularity 54 that preferably has a conforming shape to dog or dogs or equivalent locking members 56. Locking members 56 can be short segments that are individually actuated as well as a split ring whose diameter grows as the split is opened when it is urged out radially. A sliding sleeve 58 can be forced behind dogs 56 (e.g., first locks or locking members) to force them into conforming grooves 54 (e.g., second locks or locking members) after the insert assembly 38 is fully advanced into the body 32. The insert assembly 38 has a lower support plate 60 that is supported by hub 62. A seal 64 seals out sea water from below dogs 56 in its position between plate 60 and flange 48. Housing 66 (e.g., a housing portion having an interior region) in conjunction with plate 60 define an opening (e.g., a lock window) through which the dogs 56 can be cammed radially for a lock into recess 54 of flange 48. Housing 66 has a seal 68 that is above dogs 56 to keep seawater away from dogs 56 from above by sealing against flange 48.

Sliding sleeve 58 has inner seal 70 and outer seal 72 to define cavity 74 that is connected to a hydraulic pressure source 76 through lines 78, such that the cavity 74, the hydraulic pressure source 76, and the lines 78 form a backup actuator or backup actuation device, as described below. By providing pressurized hydraulic fluid into cavity 74, the increase in pressure raises sleeve 58 as a backup way to refract the dogs 56 for release of the insert assembly 38 from the body 32. The normal way that the dogs 56 are cammed radially outward is by applying axial force on rod 80 (e.g., a main actuator or main actuation device or drive) in a direction toward body 32. Rod 80, and there could be one or more than one, extends through a sealed housing 82 (e.g., a housing portion having an interior region) that is filled with a lubricant and is sealed to exclude seawater as rod 80 is moved in opposed directions by an ROV (not shown). Plate 86 moves in tandem with rod 80. Rod 88 is connected to plate 86 at its upper end and sleeve 58 at the lower end. As a result, when the ROV moves rod 80 down, sleeve 58 moves down and dogs 56 get cammed into recess 54. To release the insert assembly 38 from body 32, the rod 80 is raised and the insert assembly 38 will come out in response to an upward pull, since the dogs 56 are now unsupported after the retraction of sleeve 58. Again, sometimes the sleeve 58 will not budge under a force applied to rod 80. If that happens, there is a backup way to get the sleeve 58 to come up by applying hydraulic pressure to cavity 74. The insert assembly 38 is normally operated using components in housing 82 using an ROV to manipulated shaft 102 in a manner known in the art.

It can be seen that seals 64 and 68 that surround dogs 56 keep circulating seawater away from the dogs 56, thus keeping debris out and the corrosive effects of such exposure to a minimum. While some small quantity of seawater is present at makeup, the amount is very small and continuous exposure thereafter is no longer an issue. The moving parts that operate the sleeve 58 are disposed within housing 82 that excludes seawater and preferably has lubricating oil within. By placing these components in a lubricating bath, design life can be improved, seawater corrosion can be prevented, algae growth can be limited, and the ingress of debris can be retarded. Additionally, it is only the portion of the rod 80 that extends from housing 82 that sees seawater. A seal, not shown, surrounds rod 80 as it slides through plate 90 of housing 82.

Figure 3:
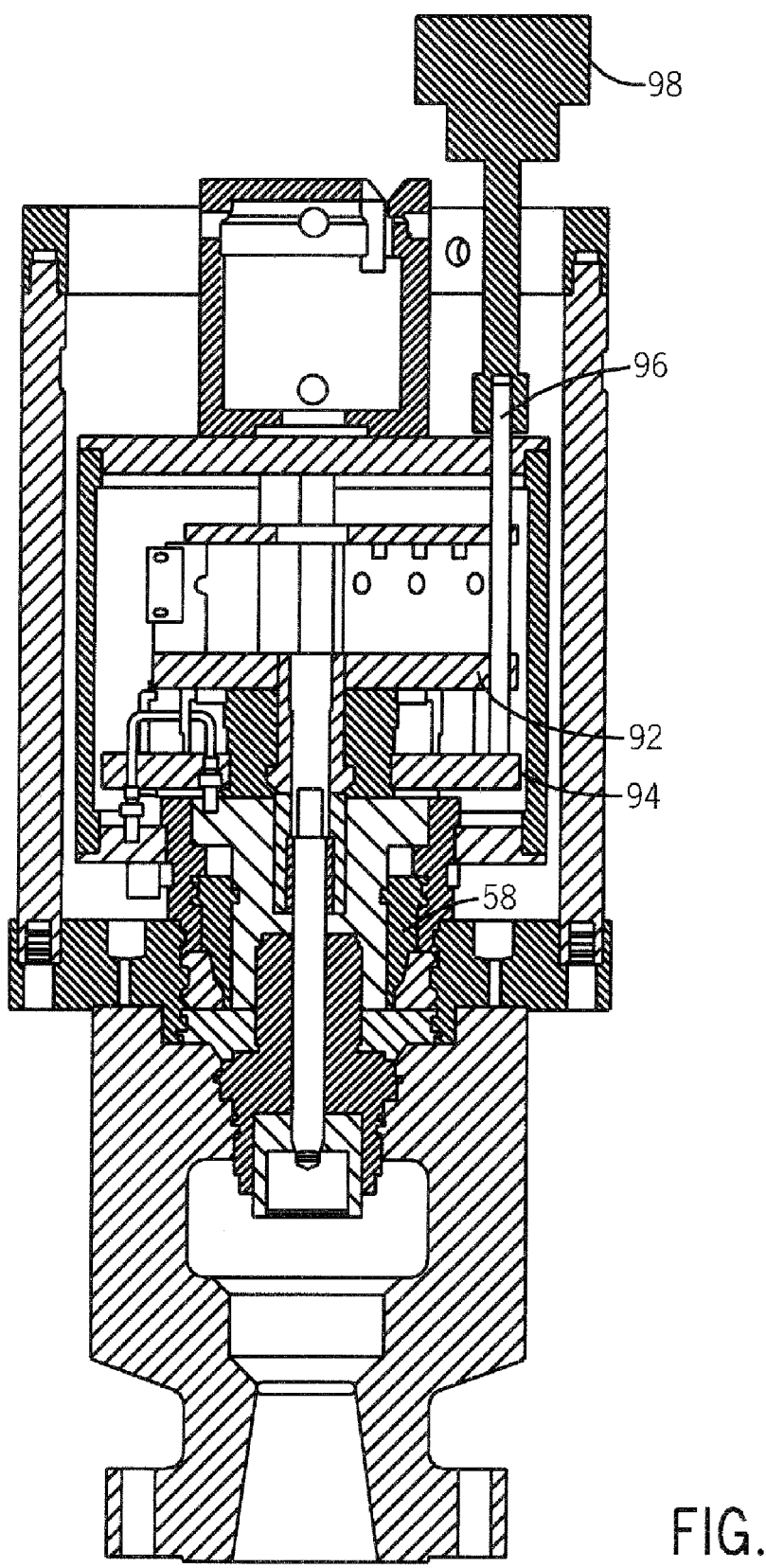
FIG. 3 is a different section than FIG. 2 showing the position lock feature when the insert is installed in the body, in accordance with certain exemplary embodiments.

The position lock feature of sleeve 58 can be better understood by noting the relative positions of upper plate 92 and lower plate 94 in FIG. 2, before looking at FIG. 3. FIG. 3 is a section at a different orientation than the FIG. 2 section to show this additional feature. FIG. 3 shows a rod 96 that extends through upper plate 92 in a threaded relationship. The rod 96 bears on lower plate 94 (e.g., a travel stop) when properly rotated by an ROV or otherwise to advance against plate 94. Because of the threaded connection at plate 92 rod 96 is tightly forced against plate 94 thus holding sleeve 58 tightly in the FIG. 2 position (e.g., an axial hold position) where it holds dogs 56 locked to recess 54 in flange 48 despite transmitted vibration. As such, the upper plate 92, lower plate 94, and rod 96 may form a position lock feature. While one type of position lock against vibration has been illustrated those skilled in the art will recognize that different locking designs can be used. One distinct advantage of the locking feature is that it too is within the housing 82 and is therefore protected from the adverse effects of prolonged exposure to seawater.

Those skilled in the art will appreciate that dogs 56 can be held retracted for run in with a band spring or equivalent 100.

The described design keeps the locking dogs 56 isolated from seawater as well as the entire drive mechanism for locking sleeve 58 except for a portion of rod 80 that extends above plate 90 in housing 82. The locking mechanism described in FIG. 3 is also isolated from seawater in housing 82. Additionally, a backup way of retracting the sleeve 58 exists if pulling on rod 80 fails to raise the sleeve 58.

The above description is illustrative of the exemplary embodiments of the present invention, and many modifications may be made by those skilled in the art without departing from the invention whose scope is to be determined from the literal and equivalent scope of the claims below:

The invention claimed is:

1. A subsea connection, comprising:
   a female component;
   a male component insertable subsea in seawater into the female component in an axial direction;
   a lock configured to move in a radial direction to selectively secure the female and male components together, wherein the lock is disposed in a sealed region configured to be isolated from access to seawater upon joining of the female and male components, and the lock comprises at least one radially movable dog that is configured to be actuated by an axially movable sleeve; and
   a position lock feature configured to hold the axially movable sleeve and the radially movable dog in a locked configuration.

2. The connection of claim 1, comprising a first actuator configured to move the axially movable sleeve in a first axial direction to move the radially movable dog into a radially locked position and a second axial direction to move the radially movable dog into a radially unlocked position.

3. The connection of claim 2, comprising a second actuator configured to move the axially movable sleeve in the second axial direction to move the radially movable dog into the radially unlocked position.

4. The connection of claim 3, wherein the first and second actuators are different from one another and the first and second actuators are configured to be at least partially isolated from seawater.

5. The connection of claim 1, wherein the position lock feature is configured to be isolated from seawater exposure.

6. The connection of claim 1, wherein the position lock feature comprises an elongated member that can be selectively advanced through a stationary plate to hold the axially movable sleeve in a stationary position with respect to the plate.

7. The connection of claim 6, wherein the elongated member and the plate connect via threads such that rotation of the elongated member advances it toward the axially movable sleeve to block movement of the axially movable sleeve away from the radially movable dog.

8. The connection of claim 1, wherein the radially movable dog is mounted to the male component and is positioned between seals when the female and male components are brought together, and the axially movable sleeve is mounted within a sealed housing that isolates the axially movable sleeve from seawater exposure.

9. The connection of claim 8, wherein the position lock feature is configured to selectively act on the axially movable sleeve to bias the axially movable sleeve to hold the radially movable dog in the locked configuration.

10. The connection of claim 9, wherein the position lock feature comprises a travel stop for the axially movable sleeve within the sealed housing that is movable into position with an operating member that sealingly extends through the sealed housing.

11. The connection of claim 10, wherein the operating member comprises a rod that is threaded through a stationary plate within the sealed housing to selectively bear against an assembly that comprises the axially movable sleeve.

12. The connection of claim 1, wherein the lock is positioned in the sealed region between opposite annular seals when the female and male components are brought together, and the opposite annular seals block entry of the seawater into the sealed region having the lock.

13. A subsea connection, comprising:
a female component;
a male component insertable subsea in seawater into the female component, wherein the male component comprises internals of a subsea choke and a housing isolated from seawater;
a lock configured to selectively secure the female and male components together, wherein the lock is sealed from exposure to seawater upon joining of the female and male components; and
an actuation device that is sealed from exposure to seawater except for an operating element configured to operate the lock.

14. The connection of claim 13, wherein the operating element is the only component of the actuation device extending from the housing and configured to be exposed to seawater.

15. The connection of claim 13, wherein the lock comprises a radially movable dog disposed axially between opposite annular seals.

16. The connection of claim 13, comprising a backup actuation device that is sealed from exposure to seawater, wherein the backup actuation device is configured to operate the lock independent from the actuation device.

17. A system, comprising:
a subsea mountable component, comprising:
a body configured to connect with an insert assembly of a subsea oilfield system along an axis;
a first lock configured to connect with a second lock of the subsea oilfield system in a radial direction relative to the axis after the body and the insert assembly connect;
a first seal disposed on a first axial side of the first lock along the axis;
a second seal disposed on a second axial side of the first lock opposite from the first axial side along the axis, wherein the first and second seals define an isolation region about the first and second locks after the body and the insert assembly connect, and the first and second seals are configured to block seawater from entering the isolation region; and
an operating member disposed within a first interior region of a first housing portion that, in conjunction with a plate of the insert assembly, defines a lock window, the operating member is configured to move along the axis to cause the first lock to move within the lock window in the radial direction, and the first and second seals are configured to block seawater from entering the first interior region after the body and the insert assembly connect.

18. The system of claim 17, wherein the subsea mountable component comprises a drive having at least a portion disposed within a second interior region of a second housing portion, the drive is configured to impart a force on the operating member to cause movement of the operating member along the axis, and the portion of the drive is sealed within the second interior region of the second housing portion to block exposure of the portion of the drive to seawater.

19. The system of claim 18, wherein a lubricant at least substantially fills the second interior region of the second housing portion having the drive, the subsea mountable component comprises a position lock feature disposed within the second housing portion, the position lock feature is configured to hold the operating member in an axial hold position that biases the first lock into a radially locked position with the second lock, and the position lock feature is configured to impart an axial load on the operating member in the axial hold position.

20. A subsea connection, comprising:
a female component;
a male component insertable subsea in seawater into the female component in an axial direction;
a lock configured to move in a radial direction to selectively secure the female and male components together, wherein the lock is disposed in a sealed region configured to be isolated from access to seawater upon joining of the female and male components, and the lock comprises at least one radially movable dog that is configured to be actuated by an axially movable sleeve;
a first actuator configured to move the axially movable sleeve in a first axial direction to move the radially movable dog into a radially locked position and a second axial direction to move the radially movable dog into a radially unlocked position; and
a second actuator configured to move the axially movable sleeve in the second axial direction to move the radially movable dog into the radially unlocked position.

21. The connection of claim 20, wherein at least one of the first actuator or the second actuator is at least partially isolated from access to seawater.

22. A subsea connection, comprising:
a female component;
a male component insertable subsea in seawater into the female component in an axial direction; and
a lock configured to move in a radial direction to selectively secure the female and male components together, wherein the lock is disposed in a sealed region configured to be isolated from access to seawater upon joining of the female and male components, the lock comprises at least one radially movable dog that is configured to be actuated by an axially movable sleeve, and the axially movable sleeve is mounted within a sealed housing that isolates the axially movable sleeve from seawater exposure.

23. The connection of claim 22, wherein the radially movable dog is mounted to the male component and is positioned between seals when the female and male components are brought together.

24. A subsea connection, comprising:
a female component;
a male component insertable subsea in seawater into the female component in an axial direction;
a lock configured to move in a radial direction to selectively secure the female and male components together, wherein the lock is disposed in a sealed region between opposite annular seals upon joining of the female and male components, the opposite annular seals block entry of the seawater into the sealed region having the lock, and the lock comprises at least one radially movable dog that is configured to be actuated by an axially movable sleeve; and
first and second actuators configured to move the axially movable sleeve in opposite first and second axial directions, respectively, to move the radially movable dog between a radially locked position and a radially unlocked position corresponding to the first axial direction and the second axial direction, respectively.

25. The connection of claim 24, wherein the lock is configured to move in the radial direction outwardly from the male component toward the female component to selectively secure the female and male components together.

26. A subsea connection, comprising:
a female component;
a male component insertable subsea in seawater into the female component in an axial direction;
a lock configured to selectively secure the female and male components together, wherein the lock is disposed in a sealed region configured to be isolated from access to seawater upon joining of the female and male components, the lock comprises at least one radially movable dog that is configured to be actuated by an axially movable sleeve, and the radially movable dog is configured to move in a radial direction outwardly from the male component toward the female component from an unlocked position to a locked position; and
a position lock feature configured to hold the axially movable sleeve and the radially movable dog in the locked position.

27. The connection of claim 26, wherein the axially movable sleeve is isolated from access to seawater.

* * * * *